United States Patent [19]

Arter et al.

[11] 4,298,897
[45] Nov. 3, 1981

[54] BUFFERED RECORDING

[75] Inventors: Nelson K. Arter, Longmont; Ernest W. Devore; Arthur B. Wills, both of Boulder, all of Colo.; Leslie R. Zelenka, Tucson, Ariz.

[73] Assignee: International Business Machines Corporation, Armonk, N.Y.

[21] Appl. No.: 77,505

[22] Filed: Sep. 20, 1979

[51] Int. Cl.³ .................. G11B 5/09; G11B 5/12; G11B 21/08; G11B 21/10
[52] U.S. Cl. ............................. 360/39; 360/48; 360/63; 360/77; 360/78
[58] Field of Search .............. 360/61, 63, 64, 39, 360/78, 77, 121, 48, 40

[56] References Cited

U.S. PATENT DOCUMENTS

| 3,480,931 | 11/1969 | Geissler et al. | 360/39 |
| 3,487,374 | 12/1969 | Droux | 360/39 |
| 3,641,502 | 2/1972 | Whitehead | 360/61 |
| 3,751,599 | 8/1973 | Ogawa et al. | 360/7 |
| 3,869,721 | 3/1975 | Kooda | 360/53 |
| 3,932,894 | 1/1976 | Arter et al. | 360/134 |
| 3,986,209 | 10/1976 | Beecroft et al. | 360/121 |
| 3,994,019 | 11/1976 | Sagishima | 360/33 |
| 4,011,587 | 3/1977 | Arter et al. | 360/62 |
| 4,068,268 | 1/1978 | Idemoto et al. | 360/66 |
| 4,183,066 | 1/1980 | Anderson | 360/40 |
| 4,231,071 | 10/1980 | Anderson | 360/40 |

OTHER PUBLICATIONS

IBM Technical Disclosure Bulletin, vol. 21, #12, May 1979, Arter et al., "Recording".
Patent Abstract of Japan, vol. 3, No. 86, Jul. 24, 1979, p. 68E125; application 54-65012.

Primary Examiner—Vincent P. Canney
Attorney, Agent, or Firm—Herbert F. Somermeyer

[57] ABSTRACT

A forward/backward compatible apparatus and record member achieves multiple density by multiple track widths as well as multiple lineal densities. In a rotating head recorder a single head has a wide write gap followed by a plurality of narrow read gaps. In recording, narrower tracks--i.e., higher densities, the record medium is moved less than the width of the write gap for recording narrower tracks. The narrower tracks have the same width as the trailing read gaps. During readback, all read gaps are simultaneously operative. Signals from one of the read gaps are processed immediately, while signals from the remaining read gaps are buffered until a dead time occurs, such signals are then processed. The same principles are applicable to magnetic card and magnetic disk recorders. A record member of the disclosure employs a table of contents area always recorded at the lower density--i.e., widest track. The table of contents contains indicia indicating the track density as well as the lineal density of the other recording areas. The buffering also is employed to overlap seeks in a disk file for greater data accessibility.

44 Claims, 9 Drawing Figures

BUFFERED RECORDING

DOCUMENT INCORPORATED BY REFERENCE

U.S. Pat. No. 3,932,894 shows a rotating head recorder and record member with which the present invention can be advantageously employed.

BACKGROUND OF THE INVENTION

The present invention relates to data recorders and, more particularly, to those data recorders employing cyclic recording and readback operations which may include a portion of a cycle during which no signals are sensed.

As many new products reach the marketplace in the digital signal recording area, there is a continuing desire to increase the areal recording density. While in many instances the record media can retain such increased densities, the data recorders have to be substantially changed. In many instances, there is no forward/backward compatibility between the original low density recording and the new high density recording. Such incompatibilities, while in many instances are unavoidable, add to the cost of signal recording and are to be avoided if at all possible.

Forward/backward compatibility was achieved in one-half inch tape digital data signal records originally when one-half inch tapes used NRZI recording at 200, 556 and 800 bytes per lineal inch. Operator selection was required for the digital data recorders to operate with different density tapes. When phase encoded recording came into being, all phase encoded tapes were identified by a burst of phase encoded signals in a plurality of tracks at the beginning of tape. Such identification was called a TEID. Such tapes were used in conjunction with NRZI tapes, which still required operator intervention for successful recorder operation at multiple lineal densities. The increase of areal densities can also be achieved by increasing track density while not changing lineal density, or by simultaneously changing both densities.

Higher density signal recording often yields an effective higher data rate. This is particularly true with increased lineal densities. When increasing areal densities without increasing the lineal density, the burst data rate does not increase nor does the effective (average) data rate increase. Accordingly, it is desirable to increase track density while simultaneously increasing the effective data rate, all at a minimal cost in the recorder.

As mentioned above, multiple densities in one-half inch tapes required manual selections. With present day automation, it is highly desirable to increase the flexibility of recorders for enabling automatic recorder operation than is amenable to diverse track densities and diverse lineal densities. Many recording devices transfer data signals only a portion of the time; such as rotating head recorders, reciprocating head recorders, during track switching in any recorder, and those recorders employing so-called sector servos. The time remaining in recorder cycles is termed "dead time"—no data is transferred. Such dead time is dedicated for servoing, moving the magnetic medium with respect to a transducer, or vice versa, as well as performing other miscellaneous control functions. It is desirable to minimize the adverse effect on data rates of such dead time in signal recorders. When employing such automatic means, the arrangement on the record media should facilitate the automation of multiple density recording for achieving fully automatic forward/backward compatibility among diverse record members.

SUMMARY OF THE INVENTION

It is an object of the invention to enhance signal recorder operation for accommodating diverse densities while enhancing effective signal transfer rates.

It is another object to provide buffering with immediate processing for enhancing data accessability. In accordance with the invention, a preferred record member adapted to be translated in a recording device has a plurality of data signal storage areas. One of the data signal storage areas is always recorded at a lowest possible density—i.e., track or lineal density. Such one data signal storage area contains signals identifying the characteristics of the record member, including track and lineal densities. Others of the data signal storage areas contain signals at track and lineal densities indicated by the one record storage area. The one data signal storage area can be a record medium table of contents area or label area.

A method of operating with signal record members, particularly the record member identified above, includes relatively moving a record member and a relatively wide recording gap transducer a distance less than the width of the transducer for recording narrower tracks. On readback a plurality of narrow readback gaps disposed in an immediate juxtaposition to the relatively wide write gap simultaneously sense a plurality of the recorded narrower tracks for simultaneously supplying plural streams of signals being sensed. One of the streams being sensed is immediately processed, while the other streams of sensed recorded signals are buffered for later processing, such as during dead times of the recorder apparatus. In a rotating head recorder, such dead time is a portion of time when the sensing transducers are not scanning the record member. In the reciprocating head recorder, such dead time can be the flyback time or track switch time between adjacent parallel tracks. In a recording disk, such dead time can be servo sector or track switch times.

A signal readback circuit in accordance with the invention operates with a record member for receiving signals simultaneously from a plurality of read gaps. Signals received via one of the read gaps are immediately supplied to a data utilization means, such as an error correction circuit, while signals from all of the remaining read gaps are buffered awaiting the dead time of the signal recorder. Signal transfer means then transfers the buffered signals from the buffer to the data utilization means during the recorder dead seek or switching time. A programmable control unit is utilized in evaluating signals received from a record medium which indicate track or lineal densities for controlling and selecting recorder operation for accommodating a diversity of track and lineal densities while maintaining a maximal effective signal transfer rate.

Partial buffering of data signals enhances data access while keeping buffer size small.

The foregoing and other objects, features, and advantages of the invention will be apparent from the following more particular description of preferred embodiments of the invention, as illustrated in the accompanying drawings.

THE DRAWING

Figure 6:
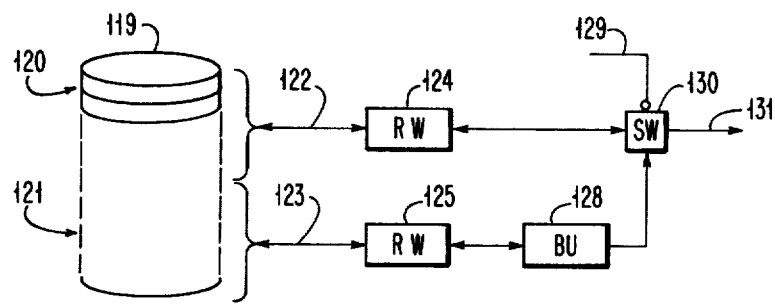

FIG. 6 diagrammatically shows a disk file with a partial buffer arrangement.

Figure 7:
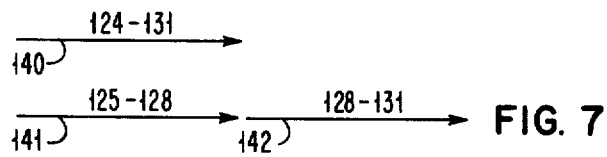
Figure 8:
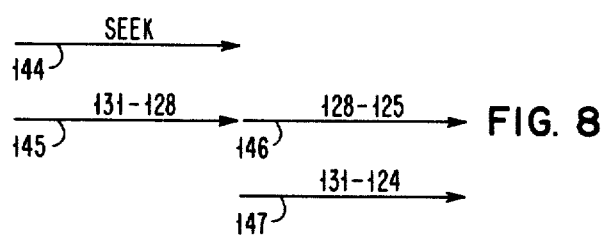

FIGS. 7 and 8 are timing diagrams showing operation of FIG. 6 apparatus.

Figure 9:
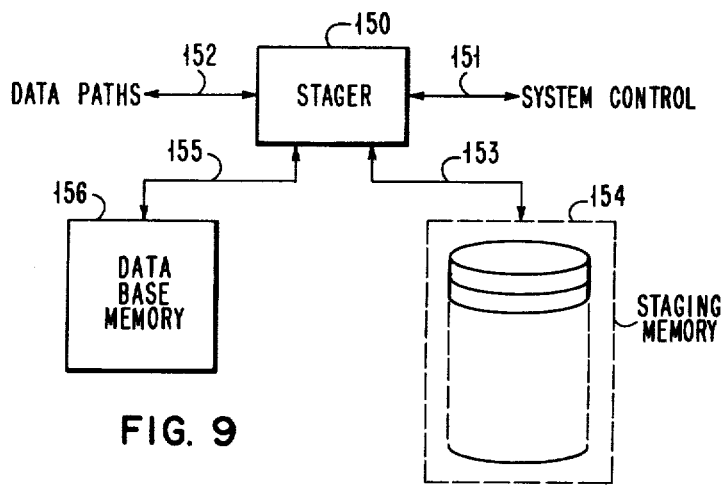

FIG. 9 is a diagram of a staging storage system having enhanced data access.

DETAILED DESCRIPTION

Figure 1:
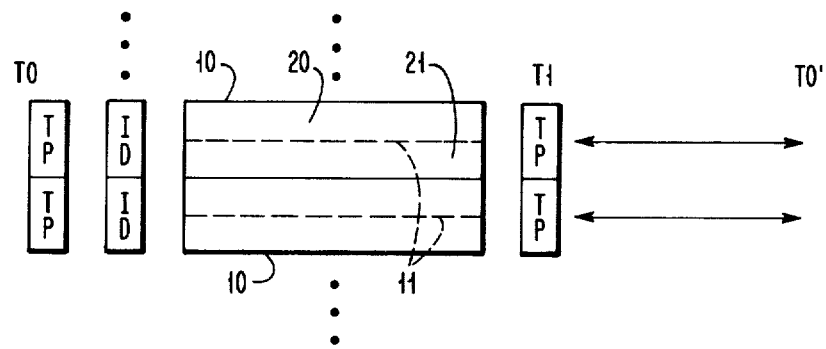
FIG. 1 is a diagrammatic showing in the time domain of a magnetic rotating head recorder operation, which advantageously employs the present invention.

Referring now more particularly to the drawings, like numerals indicate like parts and structural features in the various diagrams. A diagrammatic timing diagram with record areas of a record medium usable with a rotating head signal recorder (U.S. Pat. No. 3,932,894) is shown in FIG. 1, Elapsed time from T0 through T1 is a period of the recorder cycle during which a rotating head 16 is scanning a record member (not shown). The portions TP indicate track positioning (servo) signals being sensed. In the illustrated rotating head signal recorder, a track positioning set of signals is located along both edges of the record tape. In proceeding from T0 to T1, the head after scanning TP scans the track identification signals ID, then scans the data area or stripe 10. The particular rotating head signal recorder has a dead time—i.e., a time when the transducer is not scanning the record member from T1 to T0 time. In a pure data transfer sense the dead time occurs not only from T1 to T0 time, but also when the head is scanning TP and ID. Such dead times can be used for processing data signals when such processing is independent of the signals being transferred through a sensing or recording transducer. To this end, doubling the track density in data areas 10 can effectively double the average data rate of the signal recorder without altering the lineal density or the instantaneous burst data rate. Doubling track density is indicated in FIG. 1 by the dashed lines 11 indicating one-half width stripes.

Figure 2:
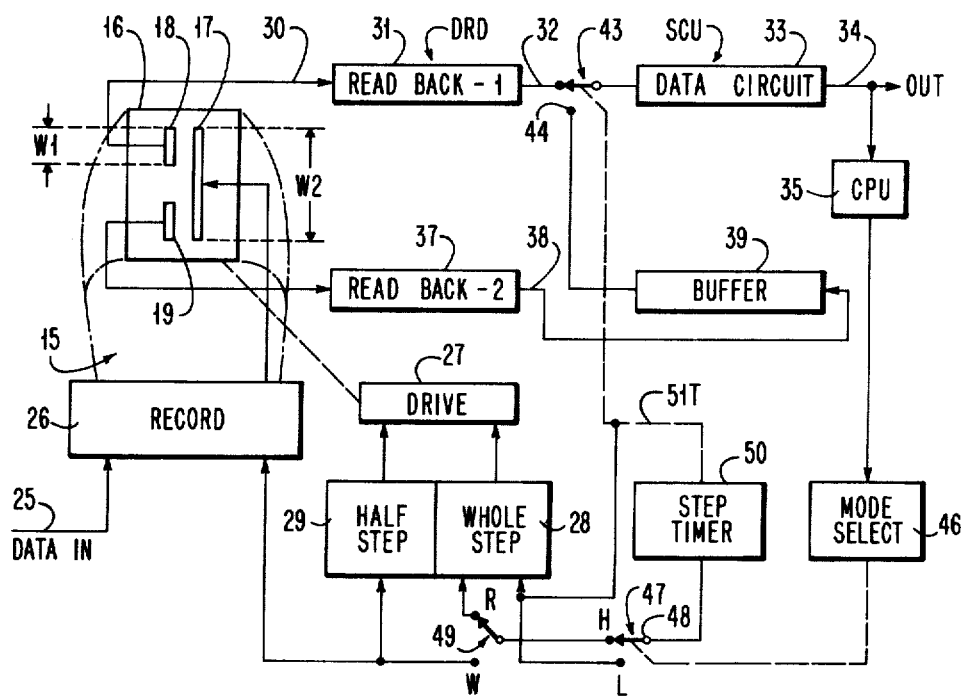
FIG. 2 is a simplified diagrammatic showing of a rotating head recorder incorporating the teachings of the present invention.

When increasing the track density in this manner, it is desirable to provide forward/backward compatibility between the various data record media. Such forward-/backward compatibility and increasing the effective data rate is achieved by the recorder constructed as shown in FIG. 2. It is appreciated that the showing in FIG. 2 is directed toward illustrating the invention and that substantially more circuits and functions are performed in a practical embodiment, all of which functions and circuits are not pertinent to the understanding of the present invention.

FIG. 2 illustrated recorder is a modification of the recorder shown in U.S. Pat. No. 3,932,894. A rotor, indicated by dashed line 15, carries a three gap magnetic transducer 16 for scanning a tape-type record member. Transducer 16 has a write gap 17 with a width W2 equal to the width of original data stripes 10 of FIG. 1. Therefore, during each recording operation, the stripe recorded by the FIG. 2 illustrated recorder will be equal to the original track density of the data recorder. A pair of read gaps 18, 19, having a width W1, are in a trailing relationship to write gap 17. Gaps 18, 19 are adapted to scan essentially one-half the width of an original stripe width 10. In FIG. 1 gap 18 will scan a one-half width stripe 20 simultaneous to gap 19 scanning one-half width stripe 21.

The use of a wide gap to record narrow record tracks (stripes) by a plurality of positioning steps transverse to track length less than the width of a write gap is known. The same technique is used by the present invention in generating half width stripes 20, 21. To this end, data signals received on an input line 25 are supplied to recording circuits 26, which may be constructed in any known manner. Recording circuits 26 supply signals to be recorded to wide write gap 17. The drive 27 which relatively moves the record tape with respect to rotating head 15 is operated in two modes as opposed to the tape positioning mode shown in U.S. Pat. No. 3,932,894. To record at the lower stripe density, whole step flip flop 28 enables drive 27 for recording one stripe to relatively move the tape record medium and the rotating head 16 the width of stripe 10. On the other hand, to record in the higher stripe density to yield stripes 20, 21, for example, half step latch 29 is set to the action condition for conditioning drive 27 for recording one stripe to relatively move the tape record and the rotating head 16 one-half the width of stripe 10. For example, if the movement of the magnetic tape is controlled by a stepping motor, and four steps move the tape with respect to head 16 to achieve a track width 10; then drive 27 provides only two steps to generate one-half width stripes 20, 21 at twice stripe density.

The readback of the lower stripe density exemplified by wide track or stripe 10 is through a single read gap 18. The signals from read gap 19 are ignored. The gap 18 sensed signals are supplied over line 30 to read back circuit 31, such as used in the recorder shown in U.S. Pat. No. 3,932,894. The readback circuit 31 detects the data in the readback signals and supplies a stream of digital data signals over line 32 each time gap 18 scans a data stripe 10. From line 32 the detected digital data signals are supplied to data circuits 33 for further processing. In one constructed embodiment, the data circuit 33 consists of error detection and correction circuits for ensuring that the signals sensed from the record medium are correct and, if not correct, are corrected. Data circuit 33 in turn supplies the detected and corrected signals over line 34 as output signals from the recording system, for example, to CPU or computer 35. In one constructed embodiment, the digital data drive 27 and readback circuit 31 are in a so-called data recording device DRD. The data circuits—i.e., the error correction circuits, and other controls (not shown) associated with a data recording subsystem, are in a storage control unit SCU.

To convert the just described apparatus to double track density, a second readback circuit 37 receives sensed signals from read gap 19. Circuits 31 and 37 operate simultaneously for detecting signals from the gaps 18, 19. During double track density readback, readback circuit 31 continues to supply its detected signals over line 32 to data circuit 33, such as the signals from half width track 20. Simultaneously signals from half width track 21 are detected by readback circuit 37 and supplied as digital data signals over line 38 to a digital data buffer 39. Buffer 39 consists of a random access memory employing semiconductive bistable circuits, magnetic bubbles, CCD's and the like. When gaps 18, 19 reach the trailing end 42 of half width tracks 20, 21, the signals from half width track 20 have been processed by data circuit 33 and the signals from half width track 21 have been stored in buffer 39. At that time a single pole double throw switch 43, of the electronic type, switches data circuit 33 from receiving signals over line 32 to the output terminal 44 of buffer 39. Buffered signals are then automatically transferred (using known techniques) from buffer 39 to be processed by data circuit 33 in the same manner that the signals received from readback circuit 31 were processed. The buffer 39 stored signals are therefore transferred to the output line 34 between times T1 and T0' time while the signals from readback circuit 31 were processed to line 34 between times T0 and T1. In this manner the original burst rate of data signals yields a doubling of the effective data rate of DRD while simultaneously doubling the stripe density.

The various control circuits for effecting the forward/backward compatibilities are described with respect to FIG. 2. Certain signals supplied by data circuit 33 are supplied to CPU 35. Those particular data signals, as will be described later with respect to FIG. 3, indicate whether or not the record medium has double stripe density—i.e., half width stripes 20, 21 or single stripe density corresponding to stripes 10. CPU has programs, not shown nor described, which evaluate the signals for determining the stripe densities. Upon detection of which stripe density is employed, mode select flip flop 46 is set to active or inactive position. If flip flop 46 is in the active condition, the high density H is indicated by electronic switch 47 being set such that common terminal 48 is connected to the H terminal for indicating high density. If, on the other hand, select flip flop 46 is in the inactive condition, switch 47 connects common terminal 48 to the L terminal for indicating low track density.

Switch 47 determines the size of the tape step movements in conjunction with the read/write electronic switch 49. When switch 47 is set to H and switch 49 is set to R, the timed stepping pulses from the step timer 50, which can be the timer shown in U.S. Pat. No. 3,932,894, supplies stepping pulses to whole step circuit 28. On the other hand, if switch 47 is set to L, the timing pulses from step timer 50 actuate whole step circuit 28 for each step. In the high density mode, switch 49 selects either whole step or half step, depending upon the read or write function. During readback, whole steps are used—i.e., since both gaps 18 and 19 simultaneously read the half track width stripes 20, 21, each step can constitute the width of stripe 10. On the other hand, during recording half step circuit 29 actuates drive 27 as previously described to record narrow stripes. The W terminal—i.e., write terminal of switch 49, is also connected to record circuit 26 for activating same. The read/write switch 49, an electronic switch, is activated in accordance with known techniques. For example, when the DRD is connected to a computer, such as CPU 35, a channel control word CCW carries signals through the SCU for selecting the read or write mode. Since such techniques are so well known, they are not further described.

Step timer 50 also controls switch 43 for selectively transferring signals from readback circuit 31 to data circuit 33 or from buffer 39 to data circuit 33. In this regard, step timer 50 supplies its stepping pulse to switch terminal 48 at or near the trailing edge 42 of the data areas 10, 20, 21. In a predetermined time relationship to this stepping pulse, step timer 50 supplies an electronic activating signal, indicated by dashed line 51T, to electronic switch 43 for switching it to terminal 44. Again, when time T0 occurs, step timer 50 supplies a second pulse, using known techniques, returning electronic switch 43 to line 32. Additionally, when switch 47 is set to L, the activating signal from mode select flip flop 46 supplies a gating signal over line 51 to block all switch 43 activations indicated by line 51T. In this manner readback circuit 31 in the low density mode always supplies signals to data circuit 33. Any signals that may be supplid to buffer 39 are ignored.

Alternatively, signals stored in buffer 39 can be used as a backup for signals received from gap 18. That is, if data circuit 33 detects an uncorrectable error in the signals received from half width stripe 20, then the signals stored in buffer 39 from stripe 21, using error recovery procedures beyond the scope of the present invention, replace the stripe 20 supplied signals.

Figure 3:
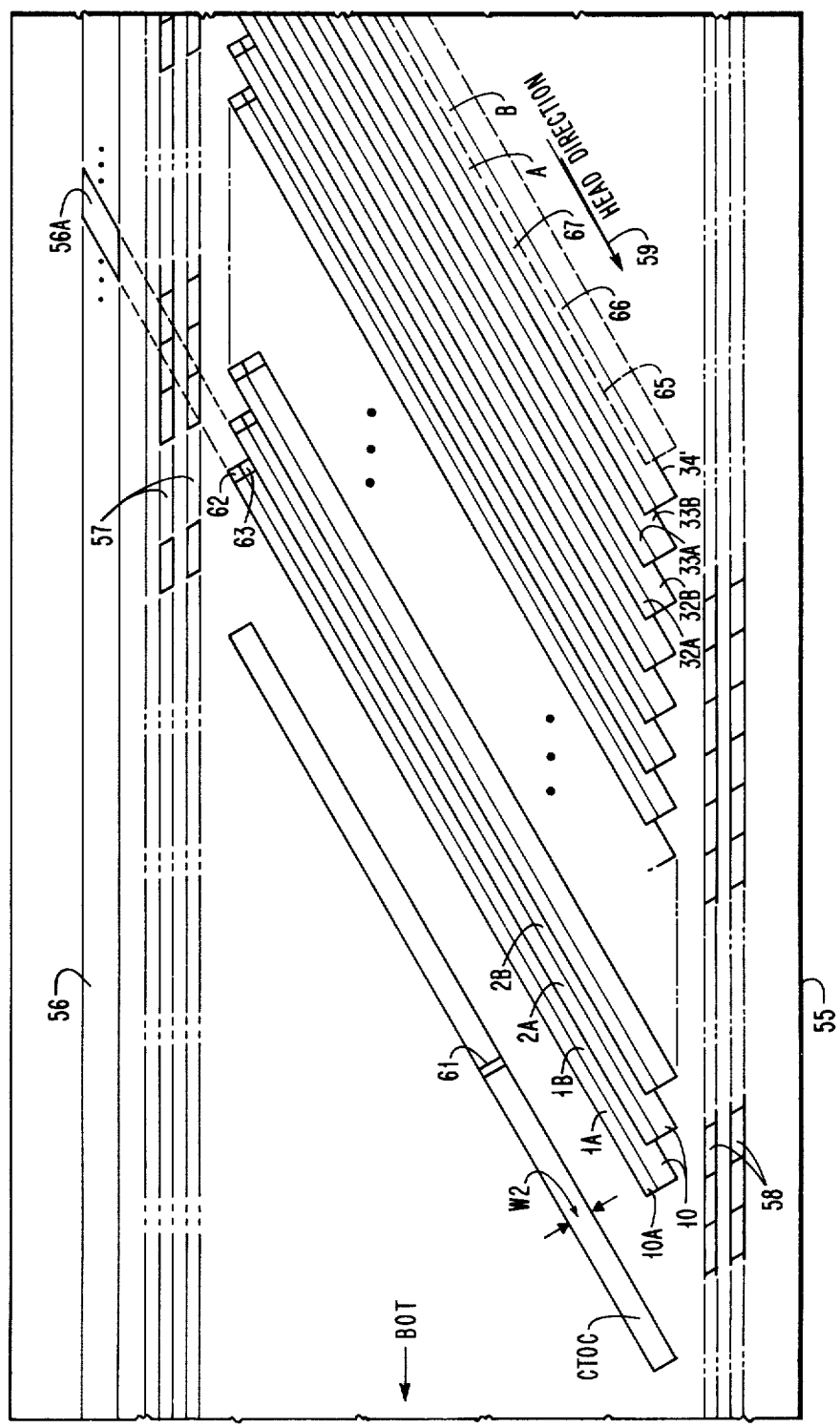
FIG. 3 is a diagrammatic showing of a record member incorporating the teachings of the present invention and adapted in particular to operate with the FIG. 2 illustrated apparatus.

FIG. 3 shows a portion of a tape 55 which employs the present invention. The general format is the same as that shown in U.S. Pat. No. 3,932,894, which includes a so called identification or ID stripe 56, a pair of stripe-indicating tracks or servo tracks 57, a plurality of data stripes 10 and a second pair of stripe indicating or servo tracks 58. The data signal format is related to data signal storage on magnetic recording disks. Many disk storage units have a stack of co-rotating disks; each disk with a multiplicity of concentric record tracks. Axially aligned tracks are termed "cylinders." For a 17 surface unit, each cylinder has 17 axially aligned tracks, one on each surface. The data signal format on the illustrated tape is arranged in blocks of stripes capable of storing one "cylinder" of data. This capacity, with spares, etc., is provided in 67 stripes. Each recording operation must use 67 stripes, one stripe being a guard band. In doubling track density the 67 one-half width stripes occupy 33.5 of the full-width stripes. After recording one cylinder of data, in writing a next adjacent cylinder, the stripe 34' (a full-width stripe) will be partially overwritten, as indicated by dashed line 65. When reading the stripe 34', the A portion will be in the first cylinder whereas the B portion 66 is in the second or next adjacent cylinder. Therefore, the first half width stripe of even numbered cylinders will always begin with a B stripe or the second half of a wide stripe 10.

Returning to FIG. 1, the A half-width stripes correspond to half-width stripe 20 and the B stripes correspond to half-width stripe 21. Of course, if an even number of half stripes were employed for storing a cylinder of data, then each cylinder would start with an A stripe. The "A" portion of stripe 34', as denominated by numeral 67, can contain only special characters—i.e., it is a guard stripe between the cylinder 1 represented by stripes 1A through 33B and the second cylinder beginning with the B stripe 66.

Internal data formats of course can vary and still practice the present invention. For example, areas 62, 63 can contain special data patterns indicating the type of track density employed in that stripe. Therefore, in addition to the volume indicator at 61 each of the data stripes can have a density indicator. For example, two zeros in a row in each of the areas 62, 63 can denominate the low density recording, whereas other bit configurations can indicate an A stripe and a B stripe in the double density configuration. In similar manner, area 56A can be modified to indicate densities, although it is preferred to have the indicators in the data area itself.

From all of the above, it can be seen that the different density recordings can be employed in the same automatic apparatus. That is, a library may contain a plurality of the data cartridges with each data cartridge indicating its own individual densities. This allows migration from a set of low density data cartridges or tape media to a set of higher density data or tape cartridges, wherein the migration occurs during normal operations. This latter feature is another advantage of forward-/backward compatibility, particularly in large mass storage systems where data base storage requires constant usage. Of course, the usual changes in support programming in microcode control have to be employed in order to take advantage of the full extent of the forward/backward capabilities.

Figure 4:
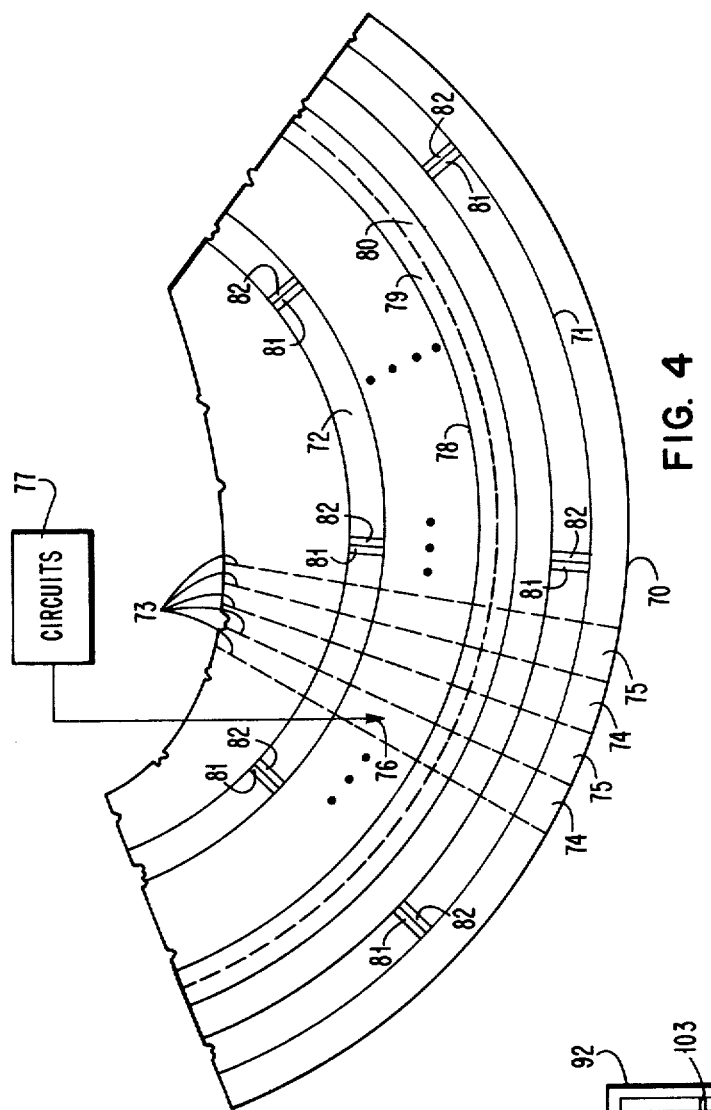
FIG. 4 is a diagrammatic partial showing of a record storage disk employing the teachings of the present invention.

While the invention has been shown in its best mode as being implemented by a rotating head recorder, no limitation thereto is intended. The invention can be applied with equal facility to diverse recorders. For example, disk and magnetic card recorders can also use the invention to a great advantage. As shown in FIG. 4 a portion of a storage disk 70 includes an outer track 71, which contains CTOC (cartridge table of contents) and an inner track 72 which contains an image of CTOC. Dashed line 73 indicates boundary line between alternating data and servo or track position sectors 74, 75. Accordingly, when a transducer 76 scans the surface of disk 70 for recording and readback via circuit 77, data signals can be transferred during sectors 74 and a dead space occurs during sector 75. Accordingly, the circuits of FIG. 2 can be employed as circuit 77. In this regard, the outer and inner tracks 71, 72 are recorded in the wider track format—i.e., low track density. The intermediate tracks which can be data tracks such as track 78 can be recorded in either of the wide or narrow formats. For example, in the outer area of the disk, the higher speed may enable narrow tracks to be employed. Therefore, track 78 may include two half width tracks 79 and 80 which are operated in the same manner as tracks 20, 21 of FIG. 1. The inner tracks then can contain only the wide tracks. In a similar manner, the lineal densities of track 78 may be increased even though the track width is halved. All of this information is contained in the tracks 71, 72, for track density indicated by the areas 81 in lineal density by areas 82. These areas are repeated around the circumference of the disk for decreasing total initial access time. The disk record of FIG. 4 can also be a spiral track and still employ the teachings of the present invention.

Figure 5:
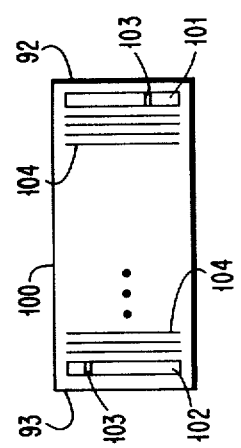
FIG. 5 shows a magnetic card implementation of the invention.

In a similar manner, a magnetic card 100 can be arranged as shown in FIG. 5. Of course instead of concentric circular tracks, there would be parallel longitudinal tracks with a CTOC tracks 101, 102 bracketing the data tracks 104. In this manner the orientation of the card is not as important when inserted into the reader. For example, if card 100 is inserted as from end 92 track 100 would be read first. However, if the card were inserted from end 93, then track 102 would be read first. The recording apparatus can read in either direction provided the detection is symmetrical and the appropriate data handling circuits are provided. Areas 103 contain track and lineal density indicating bits.

Certain aspects of the present invention can be employed independent of multiple track widths; that is, rather than full buffering a storage device, such as a disk file 120 (FIG. 6), the principles of the present invention for real time processing a predetermined portion of signals to or from a disk file while buffering the remaining portion enhances data access while minimizing buffer size, hence cost. In one embodiment, the top one-half disk of disk file 120 a logical portion to be processed in a real time mode while the bottom half portion 121 has signals processed in a buffered mode. The disk surfaces are scanned by the usual transducers with a servo surface guiding the transducer via the usual track seeking and positioning servo mechanism (not shown). In the usual disk file, one and only one transducer is used at a time thereby providing a serial stream of data bits. In the FIG. 6 illustrated embodiment, two transducers are used at a single time to provide two serial strings of data bits respectively transferred over lines 122 and 123 from a transducer (not shown) in the respective halves 119 and 121 of disk file 120. A pair of read-write circuits 124, 125 of usual design are connected respectively to lines 122 and 123. In reading signals from disk file 120, read-write circuits 124 pass its received signals on a real-time basis through switch 130 to cable 131 which is connected to a host or control unit (not shown) in the usual manner. A control line 129 carries signals to actuate switch 130 to pass the signals from read write circuits 124 during a first portion of the read cycle. Switch 130 can be compared to switch 47 of FIG. 2 while line 129 can be compared with terminal 48. Simultaneously, with the real time data transfer from read/write circuits 124, read/write circuits 125 are passing signals from line 123 to buffer 128. Upon completion of the real time data transfer, line 129 signal from a source (not shown) such as a digital computer, actuates switch 130 to connect buffer 128 to cable 131. Then the signals are automatically transferred from buffer 128 over cable 131 using known techniques. While the buffer 128 is transferring the signals, the next track of disk file 120 can be accessed; that is, the seek time is overlapped with the buffer transfer time as best seen in FIG. 7. Arrow 140 represents the real-time data transfer from read/write circuits 124 to cable 131. During the same time period, signals from read/write 125 are transferred to buffer 128 as indicated by arrow 141. The buffer 128 to cable 131 transfer is represented by arrow 142 which is time concurrent with the seek of disk file 120 represented by arrow 143. While the track to track seek time may be substantially longer than the actual buffer signal transfer time, still the reduction in time is significant in a large data processing environment.

Principles of the invention are also applicable to recording signals on disk file 120. In this situation, signals are transferred from cable 131 to disk file 120. Initially, the first signals received are transferred to buffer 128 via switch 130 and as indicated by arrow 145 in FIG. 8. Simultaneously, the head is seeking the appropriate track as represented by arrow 144. Upon completion of the buffer 128 being filled and the seek 144 being completed, signals are recorded in both portions 119 and 121 of disk file 120 as represented by arrows 146 representing the transfer from buffer 128 to read/write circuits 125 and arrow 147 representing the transfer of signals from cable 131 to read/write 124. A control signal on line 129 actuates switch 130 in a known manner for timing the data transfers represented in FIG. 6 through 8.

Another application of the invention is in a staging storage subsystem of FIG. 9. In this instance, a stager such as a staging adapter, IBM Model 3803-3, manufactured by International Business Machines Corporation, Armonk, N.Y., is controlled by a mass storage controller via cable 151 as controlled by the mass storage controller (MSC) (not shown) of the IBM 3850 Mass Storage System, also manufactured by International Business Machines Corporation. Data paths to hosts of stager 150 are represented by double-headed arrow 152. Data access is provided over serial data paths 153 to a staging memory 154 consisting of a plurality of disk files. Signals are generally stored in a data base memory 156 which may be the IBM 3851 Mass Storage Facility (MSF) (not shown) which is a portion of the IBM 3850 Mass Storage System. In general, signals are transferred between staging memory 154 and data base memory 156 over cables 153 and 155 via a buffer (not shown) in stager 150. By using the principles of the present invention, single line cable 153 is replaced by single line cables 122, 123 and the staging memory 154 operates as described with respect to FIG. 6. The practical effect of this arrangement is to free stager 150 for more functions within the mass storage system thereby not only increasing data access of the disk file constituting staging memory 154 but also enables the program stager 150 to provide other mass storage system function in an overlap manner with staging and destaging operations; i.e., transfer of signals between memory 156 and memory 154. For example, if two disk files share stager 150, then the access to the two disk files by stager 150 would be greatly enhanced thereby disproportionately increasing performance of the mass storage system in accordance with the changes effected by the present invention.

Although the present invention has been particularly shown and described with reference to preferred embodiments thereof, it will be understood by those skilled in the art that various changes in form and details may be made therein without departing from the spirit and scope of the invention.

What is claimed is:

1. A signal recorder adapted to exchange signals with a record member in any of a first plurality of track widths, the improvements including in combination:
   a transducer adapted to scan tracks on a record medium and having a write gap with a first track width for scanning one track of said first width equal to a total width of a first plurality of a second and narrower track width and further having a plurality of read gaps aligned with said write gap along a length of said first width track, and each of said read gaps having a width corresponding to said second track width and being said first track width divided by said first plurality and said gaps being in a side-by-side arrangement for simultaneously scanning a said first plurality of said second width tracks;
   track switching means operative during recording signals for switching between predetermined juxtaposed ones of said tracks having said second track widths and operative during reproducing signals to simultaneously switch between juxtaposed groups of said first plurality of tracks equalling said second track width;
   means for simultaneously receiving signals from said read gaps which simultaneously scan said first plurality of said tracks having said second track width; and
   means for serializing all signals produced from said simultaneous sensing.

2. The recorder as set forth in claim 1 wherein said recorder exhibits a cyclic period of operation wherein said transducer scans a data record area on said record member during a predetermined portion of said cyclic period, and
   said means for serializing transferring a first of said signals from a one of said read gaps while said head is scanning said record area and transferring the remainder of the signals from others of said read gaps during a portion of said cyclic period outside of said predetermined portion,
and
   means for momentarily storing signals read from said other read gaps for serializing during said cyclic period.

3. The recorder as set forth in claims 1 or 2 wherein said read gaps are all substantially equally spaced from said write gap.

4. The data recorder as set forth in claim 3 wherein said transducer scans intermittent data and non-data areas,
   said means for serializing including means for immediately processing signals from a one of said gaps,
   buffer means for momentarily storing signals from others than said one read gap, and
   means selectively transferring said buffer signals through said immediate signal processing means.

5. The recorder as set forth in claim 4 further including mode select means for indicating a high density or a low density recording, said means for serializing being responsive to said low density indication for supplying said signals from said one gap to the exclusion of signals read from other than said one gap and means inhibiting said track switching means from switching between said predetermined two juxtaposed ones of said tracks having said second track width and switching only between groups of said tracks having said second track width.

6. The recorder as set forth in claim 5 wherein said record member includes an indication of recording density,
   means sensing said recording density indication and actuating said mode selection in accordance with said sensing.

7. The recorder as set forth in claim 6 wherein said record member density indication is in a CTOC area and
   means in said recorder forcing said mode select to the low density whenever said CTOC is to be sensed.

8. The recorder as set forth in claim 7 wherein said sensing means includes a readback circuit for each of said read gaps, a first of said readback circuits being connected to said one read gap, a second of said readback circuits being connected to a second of said read gaps, said second readback circuits supplying output signals to said buffer,
and
   electronic switch means connected to said immediate signal processing means for selectively receiving signals from said first readback circuit or from said buffer.

9. The recorder as set forth in claim 8 wherein a rotor supports said transducer for rotation along a scan path and said record member is in an elongated flexible tape that is to be scanned obliquely by said transducer as it rotates, and said track switching means including tape transport means for selectively moving said record member a half step or a whole step in accordance with said mode select and said record readback function.

10. The recorder as set forth in claim 9 further including programmable means for receiving signals from said immediate signal processing means and connected to said mode select means for selecting a mode in accordance with CTOC signals supplied by said immediate signal processing means.

11. The recorder as set forth in claim 6 wherein said record member is a circular disk and said transducer scans radially displaced tracks on said disk, mode select means connected to said means for serializing for receiving signals from an outer one of said tracks and for indicating the densities recorded in other ones of said tracks, which densities can be the same or greater than the density in said outer of one of said tracks, and said disk having interleaved track position and data areas and said means for serializing transferring signals when said transducer is scanning both said data and track position sectors.

12. A signal readback circuit for transferring signals from a record member capable of storing signals at diverse signal densities, the improvement including in combination:

signal sensing means operatively associated with said record member for sensing signals recorded on said record member regardless of recorded signal densities, including intermittently sensing data signals and for supplying readback signals which include data signals;

control means for receiving data signals from a first portion of said record member at a lower density of said diverse signal densities from said signal sensing means for receiving a low density signal which indicates a signal density in other portions of said record member;

data circuit means for processing sensed data signals regardless of density at a net effective rate for said lower one of said densities;

data buffer storage means for temporarily storing data signals; and switch means electrically interposed between said signal sensing means, said data circuit means and said data buffer storage means and being responsive to said control means to transfer all low density signals from said signal sensing means to said data circuit means and a prorata portion of sensed higher density signals to said data circuit means and a simultaneous transfer of a remainder portion of said high density signals to said data buffer storage means, and having means for connecting said data buffer storage means to said data circuit means whenever said signal sensing means at least momentarily stops supplying signals.

13. The signal readback circuit set forth in claim 12 wherein said signal sensing means includes a plurality of readback circuits for simultaneously processing and detecting signals simultaneously received from a record medium, a first of said readback circuits supplying signals only to said data circuit means via said switch means;

a second of said readback circuits supplying signals only to said data storage buffer means, and mode select and control means responsive to said data circuit means to actuate said switch means synchronously with signals read back through said readback circuits and selectively inhibiting transfer of signals from said buffer data storage means to said data circuit means whenever a predetermined low density signal is being processed by said first readback means.

14. A rotating head data recorder having a rotational period with a head having side-by-side read gaps which are adapted to sense a record medium during about one-half of a rotational period, readback data circuit means selectively coupling a first of said read gaps to said data circuit means for processing signals from one of said read gaps, a signal buffer, means for transferring signals from a second of said read gaps to said buffer whenever both said read gaps are reading signals, and delayed transfer means for transferring signals from said buffer to said data circuit means whenever said read gaps are not sensing signals recorded on said record medium.

15. The rotating head data recorder set forth in claim 14 further including means inhibiting transfer of signals from said buffer whenever a signal from both of said read gaps are substantially identical.

16. The recorder set forth in claim 14 further including drive means for selectively moving said record medium to different recording areas, first control means for actuating said drive means to relatively move said record medium and said side-by-side read gaps a distance equal to the total width of said read gaps, second control means for actuating said drive means for relatively moving said record medium a width about equal to a one of said side-by-side read gaps, a write gap in said head in juxtapositioned side-by-side read gaps and having a total width equal to the cumulative width of said side-by-side read gaps, and means for simultaneously actuating said recording circuit and said control means for relatively moving said record medium a distance equal to the width of one of said side-by-side read gaps and at other times actuating said first mentioned control means.

17. The recorder set forth in claim 16 for operating with a record medium having a CTOC record area and control means operative to inhibit said delayed transfer means whenever said CTOC areas are being sensed.

18. The rotating head data recorder set forth in claim 14 further including mode select means for selecting one of a plurality of recording densities when indicating a first of said densities inhibiting operation of said delay transfer means when indicating a second of said densities enabling said delayed transfer means.

19. The rotating head data recorder set forth in claim 18 further including analysis means for receiving signals of said record medium in a CTOC area, said mode select means always being actuated when CTOC signals are being received, and said analysis means including means for actuating said mode select means in accordance with signals received from said CTOC area.

20. The rotating head data recorder set forth in claim 14 further including control means for selectively inhibiting operation of said delay transfer means, and drive means for relatively moving said record medium with respect to said side-by-side read gap and said drive means moving said record medium and said head in steps wherein said steps have a distance equal to the cumulative width of said side-by-side read gaps.

21. The rotating head data recorder set forth in claim 20 further including means inhibiting said delay transfer means, said inhibiting means being operative when a lower density is being sensed and inoperative when a higher track density is being sensed.

22. A method of operating a data recorder for enabling recording signals in diverse track widths, the steps of:
recording signals on a record medium using a recording instrumentality for scanning a record track to record signals longitudinally in such first track having a first track width;
selectively and firstly adjusting said record medium and said recording instrumentality transversely to said scanned track length a predetermined transverse distance equal to a desired record track width not greater than said first track width;
repeating said recording and first adjusting steps a plurality of times to record signals in a plurality of parallel tracks;
simultaneously longitudinally scanning selected ones of said record tracks with a plurality of sensing instrumentalities for producing a like plurality of simultaneously occurring trains of sensed signals; and
selectively and secondly adjusting said record medium and said plurality of sensing instrumentalities transversely to the longitudinal extent of said selected record tracks a distance of not less than said first track width.

23. The method set forth in claim 22 further including the steps of:
repeating said simultaneous scanning and said second adjustment steps and for each such repetition;
processing one of said trains of sensed signals as such signals are produced from said record medium;
buffering and storing all other said trains of sensed signals; and
processing all said buffered other trains of sensed signals before repeating each said simultaneous scanning.

24. The method set forth in claims 22 or 23 further including selectively inhibiting said buffering and processing of the buffered signals whereby signals from only one of said read gaps is processed.

25. Digital data signal storage apparatus adapted to exchange signals with a movable record member with a plurality of record tracks and operatively associated therewith, comprising
first and second transducers for simultaneously scanning a pair of said record tracks for exchanging digital data signals therewith;
means for simultaneously relatively moving said record member and said transducers whereby different ones of said record tracks constitute said pair of scanned record tracks;
first and second read-write circuit means electrically connected to said first and second transducers, respectively;
input-output means connected to said first read-write circuit means for exchanging signals therewith;
digital data buffer means connected to said second read-write circuit means for exchanging digital data signals therewith; and
said input-output means, said first read-write circuit means and said digital data buffer means for alternately electrically operatively connecting said input-output means to said first read-write circuit means and said buffer means and including switch control means operative such that signals transferred serially through said input-output means are exchanged alternately with said first read-write means and said buffer means thereby enabling simultaneous signal exchange with said record member and serial signal transfer through said input-output means.

26. The digital data signal storage apparatus set forth in claim 25 wherein said digital data buffer means and ones of said record tracks have comparable storage capacities so that signals read from a one of said record tracks can be stored in said buffer means.

27. The digital data signal storage apparatus set forth in claims 25 or 26 wherein said switch control means alternates said input-output means connection between said first read-write means and said buffer means only when digital data signals comparable to storage of signals in a one of said record tracks has been stored in said digital data buffer means.

28. The digital data signal storage apparatus set forth in claim 27 including a plurality of record members, each said record member having a plurality of said record tracks,
a first set of transducers operatively associated with first predetermined ones of said plurality of record members, respectively;
a second set of transducers operatively associated with second predetermined ones of said plurality of record members, respectively;
said first and second transducers being in said first and second sets of transducers, respectively; and
said first and second read-write means being electrically connected to said first and second sets of transducers, respectively; and
said digital data signal buffer means having a data signal storage capacity for one said record track on all said second predetermined ones of said plurality of record members, whereby signals transferred through said input-output means are alternately exchanged with said sets of plurality of record members alternately through said first read-write means and said record read-write means plus said digital data signal buffer means.

29. A digital signal storage apparatus having first and second equal sized portions for storing digital signals, the improvement including in combination:
first signal processing means connected to said first portion for directly exchanging digital signals with said first portion;
second signal processing means connected to said second portion for directly exchanging digital signals with said second portion;
digital signal buffer means connected to said second signal processing means for exchanging digital signals with said second digital signal processing means;
input-output means connected to said digital signal buffer means and to said first signal processing means and having control means to alternately exchange signals therewith whereby said digital signal buffer means and said signal processing means simultaneously exchange signals with said portions respectively;

said control means includes means operative during predetermined time intervals for enabling said input-output means to exchange signals with said digital signal buffer means while making said signal processing means inactive, and additional means coupled to said portions and active during said predetermined time intervals for adjusting said portions for enabling signal exchange between said portions and both said signal processing means with respect to signals currently being exchanged in each time interval including signals to be next subsequently exchanged between said first signal processing means and said first portion.

30. The digital signal storage apparatus set forth in claim 29 wherein, said portions constitute a staging memory, a data base memory, data path means for exchanging digital signals with exterior means, and said input-output means includes connections to said data memory and said data path means whereby serial digital signal exchange with said staging memory are enhanced.

31. The digital signal storage apparatus set forth in claim 30 wherein said staging memory includes a rotating disk storage device having a plurality of record storage disk surfaces and with said first portion including a first set of said record storage disk surfaces and said record portion including a second set of said record storage disk surfaces.

32. The digital signal storage apparatus set forth in claims 29 or 31 wherein said additional means includes means enabling physical movement between said portions and said digital signal processing means for enabling signal access to a different physical part of said portions by said digital signal processing means.

33. The digital signal storage apparatus set forth in claims 29 or 31 wherein said first and second processing means process signals received from said portions and input-output means receives signals from said digital signal buffer means only after said first signal processing means has completed its signal processing from said first portion.

34. The digital signal storage apparatus set forth in claim 33 wherein said additional means adjust said portions while said digital signal buffer means is supplying signals to said input-output means.

35. The digital signal storage apparatus set forth in claims 29 or 31 wherein said digital signal buffer means first receives signals from said input-output means while said additional means is adjusting said portions and thereafter both said first and second signal processing means supply signals to said first and second portions respectively.

36. The method of operating a digital signal storage apparatus, including the steps of:

dividing said digital signal storage apparatus into first and second signal storage portions respectively accessed by first and second transducer means, exchanging digital signals with said first portion via said first transducer means during a first time interval;

exchanging digital signals with said second portion via said second transducer means during said first time interval;

exchanging said digital signals of said first transducer means with an external means over a first data path during said first time interval;

buffering only said digital signals of said second transducer means for enabling exchanging such only digital signals with said external means during a second time interval, and exchanging said buffered digital signals with said external means during said second time interval in the same manner and over said first data path.

37. The method set forth in claim 36 further including the step of:

adjusting the relative position of said first and second transducer means with respect to said first and second signal storage means during said second time interval such that access to said portions by said transducer means is to other areas of said portions, respectively.

38. The method set forth in claims 36 or 37 further including the step timing said time intervals as contiguously consecutive time intervals.

39. The method set forth in claim 38 wherein said first time interval immediately precedes said second time interval and wherein digital signals are transferred from said digital signal storage apparatus to said external means.

40. The method set forth in claim 38 wherein said second time interval immediately precedes said first time interval and wherein digital signals are transferred from said external means to said signal storage apparatus.

41. The method of operating a signal recorder adapted to exchange signals with a record member having a plurality of parallel record tracks accessible via transducer means relatively translatable with respect to said record member including track-to-track translation steps, the steps of:

when recording signals on said record member effecting a track-to-track translation in first discrete steps of a first distance for recording signals in tracks having a width comparable to the size of said first discrete step, and when sensing signals from said record member effecting a track-to-track translation in second discrete steps of an integral multiple of said first distance whereby a plurality of said tracks may be simultaneously sensed between each such second discrete step.

42. The method set forth in claim 41 further including the step of:

recording signals in a track width comparable to said second discrete step and overwriting such recorded track to yield a plurality of record tracks having a width comparable to said first discrete step.

43. The method set forth in claims 41 or 42 including the steps of simultaneously sensing a plurality of said tracks comparable to said first discrete step, buffering signals from all but one of said sensed tracks while supplying signals from said one sensed tracked to an external means, and supplying said buffered signals to said external means as a continuous trains of serial signals appended to said signals from said one sensed track.

44. The method set forth in claim 43 further including translating said second member and transducer means in a second discrete step while supplying said buffered signals to said external means.

* * * * *